United States Patent

Park et al.

Patent Number: 6,128,410
Date of Patent: Oct. 3, 2000

[54] PATTERN MATCHING APPARATUS AND METHOD THAT CONSIDERS DISTANCE AND DIRECTION

[75] Inventors: Hee-seon Park; Jeong-in Doh, both of Suwon, Rep. of Korea

[73] Assignee: Samsung Electronics Co., Ltd., Kyungki-do, Japan

[21] Appl. No.: 09/092,966

[22] Filed: Jun. 8, 1998

[30] Foreign Application Priority Data

Jul. 15, 1997 [KR] Rep. of Korea ...... 97-32908

[51] Int. Cl.[7] ............... G06K 9/68; G06K 9/46; G06K 9/62
[52] U.S. Cl. ............... 382/218; 382/190; 382/225
[58] Field of Search ................... 382/209, 218, 382/190, 224, 225

[56] References Cited

U.S. PATENT DOCUMENTS

| | | | |
|---|---|---|---|
| 5,621,863 | 4/1997 | Boulet et al. | 706/26 |
| 5,647,058 | 7/1997 | Agrawal et al. | 707/1 |
| 5,657,397 | 8/1997 | Bokser | 382/225 |
| 5,901,244 | 5/1999 | Souma et al. | 382/190 |

*Primary Examiner*—Ameila Au
*Assistant Examiner*—Mehrdad Dastouri
*Attorney, Agent, or Firm*—Sughrue, Mion, Zinn, Macpeak & Seas, PLLC

[57] ABSTRACT

An apparatus and method for matching sets of patterns. The apparatus matches an input pattern with reference patterns by extracting feature points of the input pattern to obtain a feature vector, and compares the feature vector of the input pattern with previously stored feature vectors of the reference patterns. The apparatus selects a reference pattern from a database and calculates the distance and direction between the input pattern and the selected reference pattern, to thereby include the reference pattern whose distance from the input pattern is equal to or less than a first threshold value in a matching comparison target, and determines whether the selected reference pattern and its neighbor reference patterns are included in the matching comparison target in consideration of the direction of the neighbor reference patterns with respect to the reference pattern, located within a circle having the point of the selected reference pattern as its center, if the distance between the input pattern and the selected reference pattern is greater than the first threshold value and the difference between the distance and the first threshold value is equal to or less than a second threshold value; and matches the patterns determined as the matching comparison target by the pattern classifier with the input pattern. Effective reference patterns are dynamically selected considering the direction and distance between the input pattern and the reference patterns, thus improving the accuracy and speed of pattern matching.

6 Claims, 3 Drawing Sheets

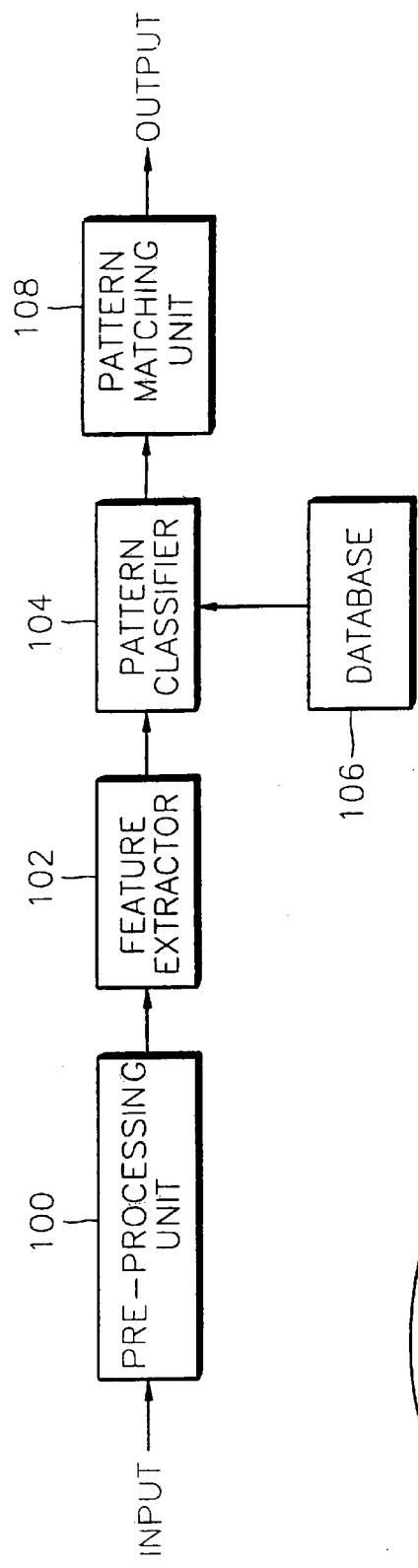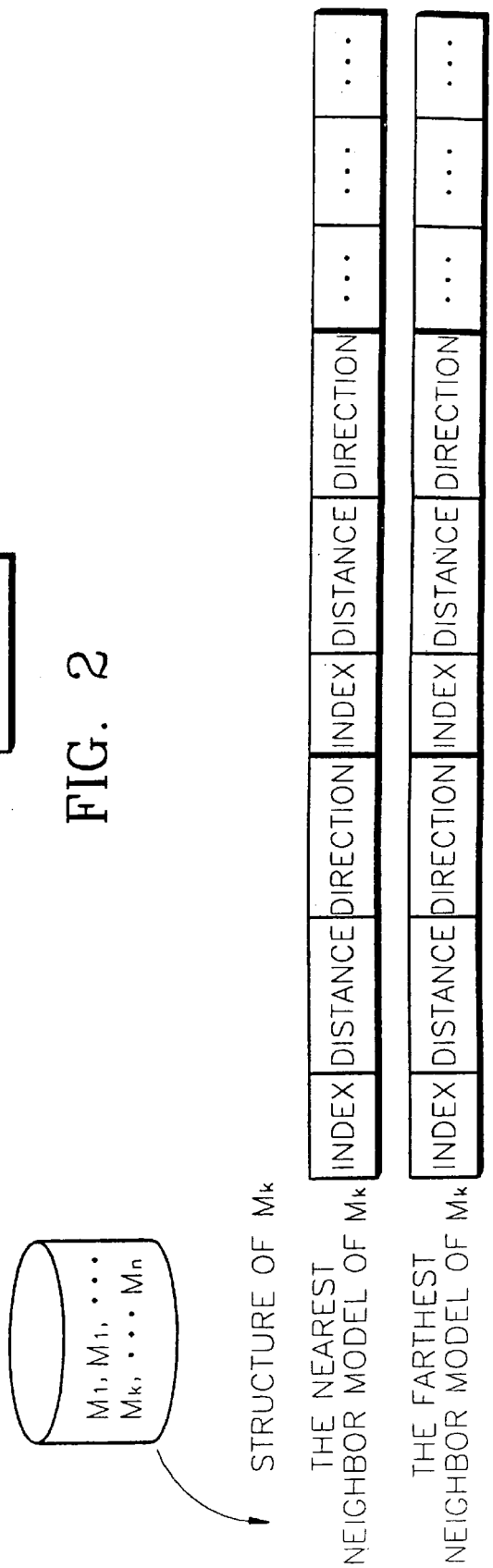

PATTERN MATCHING APPARATUS AND METHOD THAT CONSIDERS DISTANCE AND DIRECTION

BACKGROUND OF THE INVENTION

1. Field of the Invention

The present invention relates to a pattern matching apparatus and method that considers distance and direction, and more particularly, to a pattern matching apparatus and method for classifying and matching an input pattern that considers direction as well as distance between the input pattern and reference patterns.

2. Description of the Related Art

In general, pattern matching is a widely used method in a recognition system relating to pattern recognition, character recognition or sound recognition. In pattern matching, an unknown pattern is identified by investigating the degree of similarity and the degree of matching between the features of predetermined reference patterns and the unknown pattern. In order to recognize a large pattern set in real time, a high-speed pattern searching method is required. However, most actual pattern identifying methods trade-off the speed of recognition and the degree of accuracy. That is, recognition performance is low at high processing speeds, while processing speed is low in systems having excellent recognition performance.

Also, in conventional pattern matching, a predetermined number of the nearest/farthest neighbor reference patterns (hereinafter, referred to as model) of each pattern set includes unnecessary models, so that the space in memory is ineffectively occupied and the searching space is increased, thereby decreasing processing speed. Also, for patterns that are difficult to identify, only a fixed number of reference patterns are stored and used for matching, even though there are many similar patterns. This lowers the degree of accuracy.

In a conventional pattern identifying method, in which only the distance between two model vectors is considered a database having the nearest/farthest neighbor models is used. If the distance between an input pattern and a model is greater than a predetermined value $\alpha$, it is very likely that the model is far from the input pattern. Thus, k nearest neighbor patterns in the database of the model are excluded from the target to be compared for recognition (hereinafter referred to as recognition comparison target). In other words, even if a model to be compared with the input pattern is located near the boundary of a circle having radius $\alpha$ centered at the input pattern location, the predetermined number of the nearest neighbor models belonging to the model in the database are excluded from the recognition comparison target. However, it is very likely that the predetermined number of the nearest neighbor models adjacent to the model to be compared are excluded from the matching comparison target even though they are actually near the input pattern when the model to be compared is close to the boundary. Accordingly, the degree of accuracy in recognition is lowered.

SUMMARY OF THE INVENTION

To solve the above problems, it is an objective of the present invention to provide an apparatus and method for matching patterns in which the size of a database is dynamically constituted, and direction, as well as distance, are considered to identify patterns, thereby achieving exact and rapid pattern matching for a large number of patterns.

According to an aspect of the present invention, a pattern matching apparatus is provided that matches an input pattern with reference patterns by extracting feature points of the input pattern to obtain a feature vector, and compares the feature vector of the input pattern with the previously stored feature vectors of the reference patterns. The pattern matching apparatus contains: (1) a database that stores information about each reference pattern, including indices of the nearest/farthest neighbor reference patterns, distances between the reference patterns and each neighbor reference pattern and direction of the neighbor reference patterns with respect to the reference patterns, wherein the number of the nearest/farthest neighbor reference patterns depends on the features of the reference pattern; (2) a pattern classifier that selects a reference pattern from the database and calculates the distance and direction between the input pattern and the selected reference pattern, thereby including the reference pattern whose distance from the input pattern is equal to, or less than, a first threshold value, in a matching comparison target, and determining whether the selected reference pattern and its neighbor reference patterns are included in the matching comparison target when considering the direction of the neighbor reference patterns with respect to the reference pattern, located within the radius of a circle having the point of the selected reference pattern as a center point, if the distance between the input pattern and the selected reference pattern is greater than the first threshold value and the difference between the distance and the first threshold value is equal to, or less than, a second threshold value; (3) and a pattern matching unit that matches the patterns determined as the matching comparison target by the pattern classifier with the input pattern.

According to another aspect of the present invention, a pattern matching method is provided that matches an input pattern with reference patterns by extracting feature points of the input pattern to obtain a feature vector, and compares the feature vector of the input pattern with the previously stored feature vectors of the reference patterns. The pattern matching method contains the following steps: (a) extracting the feature vector of the input pattern; (b) calculating distance and direction between the feature vector of one of the reference patterns and the feature vector of the input pattern;

(c) including the reference pattern in a matching comparison target if the distance calculated in the step (b) is equal to, or less than, a first threshold value, and determining whether to include the reference pattern in the matching comparison target based on the distance and the direction, if the distance is greater than the first threshold value; and (d) matching the patterns determined as the matching comparison target in the step (c) with the input pattern.

BRIEF DESCRIPTION OF THE DRAWINGS

The above objectives and advantages of the present invention will become more apparent by describing in detail a preferred embodiment with reference to the attached drawings in which:

FIG. 1 is a block diagram of a pattern matching apparatus that considers distance and direction according to the present invention;

FIG. 2 is a diagram showing the structure of a database of FIG. 1;

DESCRIPTION OF THE PREFERRED EMBODIMENT

Figure 3:
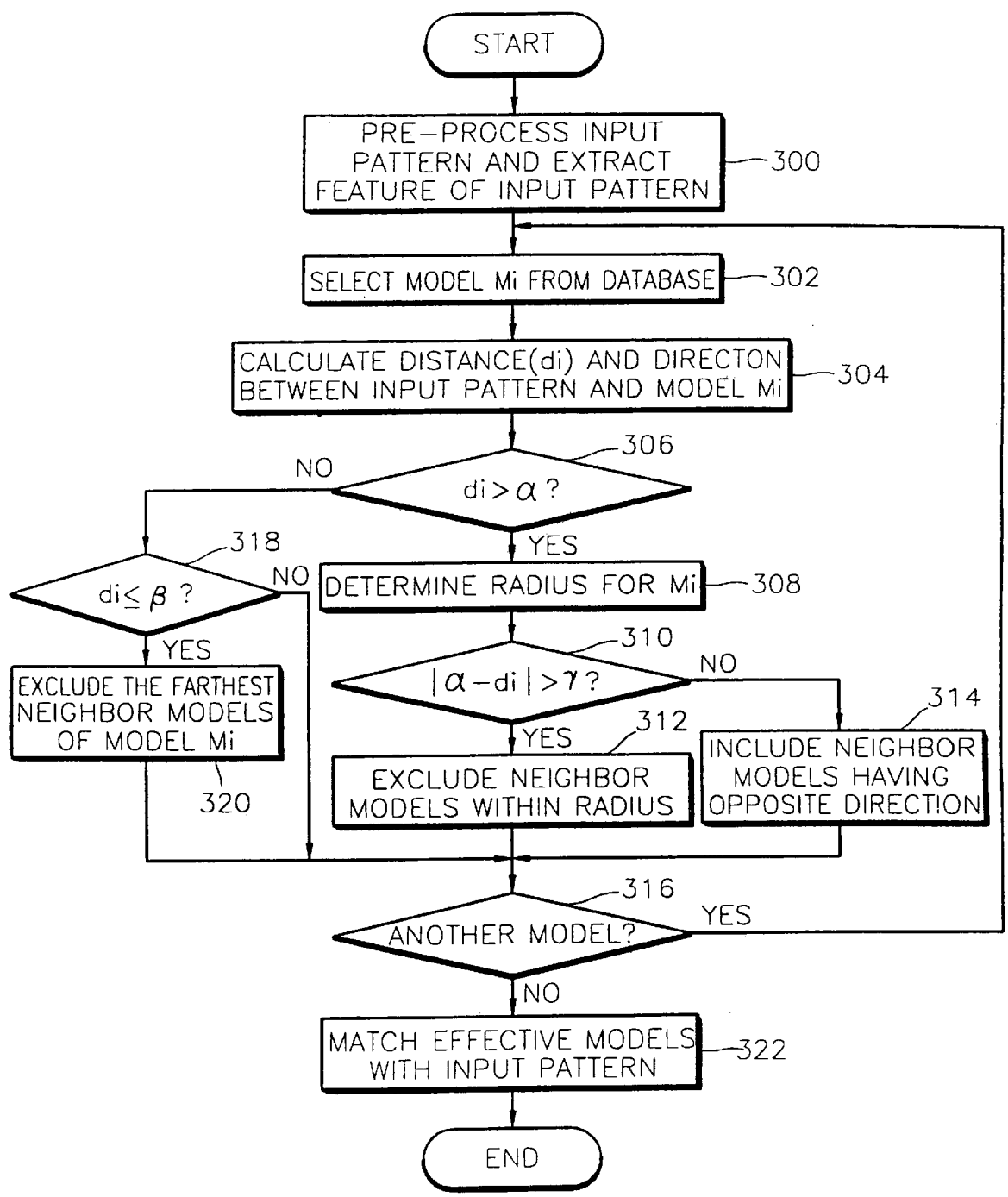
FIG. 3 is a flowchart illustrating a pattern matching method that considers distance and direction according to the present invention.

In FIG. 1, a pattern matching apparatus considering distance and direction according to the present invention includes a pre-processing unit 100, a feature extractor 102, a pattern classifier 104, a database 106 and a pattern matching unit 108.

The pre-processing unit 100 reinforces information required for pattern matching and decreases unnecessary information, thereby minimizing errors in pattern matching.

The feature extractor 102 extracts a feature vector of the pattern.

The database 106 stores indices, distances and directions of the nearest/farthest neighbor models of each model using a k-nearest neighbor identifier, as shown in FIG. 2. Here, the number of the nearest neighbor/farthest neighbor models belonging to each model depends on distribution of the models.

The pattern classifier 104 investigates the neighbors of the selected models from the database 106 to determine whether to use the neighbors as the matching comparison target.

The pattern matching unit 108 matches the matching comparison target classified by the pattern classifier 104 with the input pattern.

Figure 4:
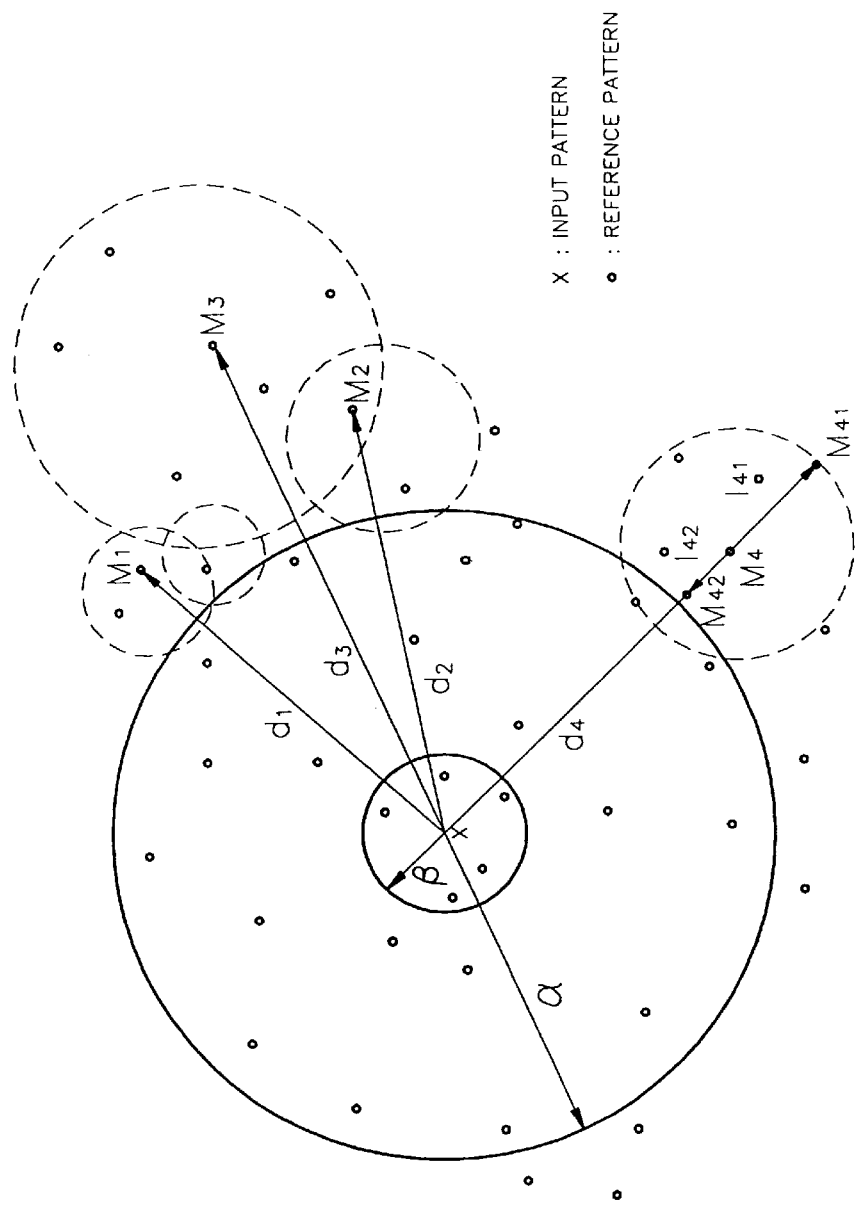
FIG. 4 is a diagram showing the distribution of reference patterns and an input pattern.

Hereinafter, the operation of the pattern matching apparatus according to the present invention will be described with reference to FIGS. 3 and 4. FIG. 3 is a flowchart illustrating a pattern matching method according to the present invention. FIG. 4 shows the distribution of an input pattern and models.

In this embodiment, an example of pattern matching for character recognition will be explained. When an input pattern, i.e., a character, is input, the pre-processing unit 100 removes noise caused by an input device, such as scanner, and performs a series of processes such as normalization of dimension, skeletonization for extracting skeleton and smoothing for error recovery. The feature extractor 102 extracts feature values of the input character, representing its original characteristics, from the pre-processed input pattern, e.g., the number of black pixels within a partial area or direction of strokes, to make feature vectors (step 300). Then, an arbitrary model $M_i$ with respect to an input pattern x is selected from the database (step 302).

The pattern classifier 104 calculates the distance $d_i$ and direction between the model $M_i$ and the input pattern x (step 304). Assuming that the vector of the input pattern x is expressed by $x=[x_1, x_2, \ldots, x_k]^T$, and the vector of the i-th model is expressed by $M=[m_{i1}, m_{i2}, \ldots, m_{ik}]^T$, the distance $d_i$ between the input pixel x and the model $M_i$ is calculated by the following equation:

$$d_i = \sqrt{\sum_{j=1}^{k}(X_j - m_{ij})^2}$$

where k represents dimension of the vector. Also, the direction is determined by the angle between two vectors.

If the calculated distance $d_i$ is greater than an arbitrary value $\alpha$ (step 306), corresponding to the cases of $M_1$, $M_2$, $M_3$ and $M_4$ of FIG. 4, the radius of the circle having the point $M_i$ as its center point is determined according to the difference between $\alpha$ and $d_i$, that is, $|\alpha - d_i|$ (step 308). That is, the radius increases if $|\alpha - d_i|$ is great, and the radius decreases if $|\alpha - d_i|$ is small. After the radius is determined, a determination of whether $|\alpha - d_i|$ is greater than an arbitrary value $\gamma$ is made (step 310). If $|\alpha - d_i|$ is greater than $\gamma$, which means that the model $M_i$ is far from the input pattern x, the models within the radius are not considered as an effective model and are excluded from the matching comparison target (step 312), that corresponds to the case of $M_3$. If $|\alpha - d_i|$ is equal to or less than $\gamma$, it is estimated that there are effective models within the radius. Then, the direction of the model with respect to the input pattern is checked and the model having the direction which is opposite to the direction to the model $M_i$ from the input pattern is considered as an effective model (step 314). As an example, as shown in FIG. 4, the direction $l_{42}$ of the model $M_{42}$ with respect to the model $M_4$ is opposite to the direction of the model $M_4$ with respect to the input pattern x, thus the model $M_{42}$ is regarded as an effective model.

If $d_i$ is equal to or less than a in the step 306, and $d_i$ is equal to or less than $\beta$ (step 318) which is less than $\alpha$, the farthest neighbor models of the model $M_i$ are excluded (step 320) and only the nearest neighbor models are considered as the effective models.

After the above steps, in order to check the effectiveness of another model (step 316), the process returns to the step 302, and then the above steps are repeated. If the number of the effective models is large enough, pattern matching is performed using the selected effective models (step 322).

As described above, the effective reference patterns, which can be used for pattern matching, are dynamically selected by considering the direction, as well as the distance, between the input pattern and the reference patterns, thus improving the degree of accuracy in matching for a large number of patterns, and the pattern matching speed. Also, the above pattern matching apparatus and method may be easily applied to recognize patterns and sounds.

What is claimed is:

1. A pattern matching apparatus for matching an input pattern with reference patterns by extracting feature points of the input pattern to obtain a feature vector, and comparing the feature vector of the input pattern with the previously stored feature vectors of the reference patterns, comprising:

a database for storing information of each reference pattern, the reference pattern information including indices of nearest/farthest neighbor reference patterns, distances between the reference patterns and each of the neighbor reference patterns and direction of the neighbor reference patterns with respect to the reference patterns, wherein the number of the nearest/farthest neighbor reference patterns depends on the features of the reference pattern;

a pattern classifier for selecting a reference pattern from the database and calculating distance and direction between the input pattern and the selected reference pattern, to thereby include the reference pattern whose distance from the input pattern is equal to, or less than, a first threshold value in a matching comparison target, and determining whether the selected reference pattern and its neighbor reference patterns are included in the matching comparison target considering the direction of the neighbor reference patterns with respect to the reference pattern, located within the radius of a circle having the point of the selected reference pattern as a center point, if the distance between the input pattern and the selected reference pattern is greater than the first threshold value and the difference between the distance and the first threshold value is equal to or less than a second threshold value, wherein the neighbor reference patterns, whose direction with respect to the selected reference pattern is opposite to the direction of the reference pattern with respect to the input pattern in the matching comparison target, are included in the matching comparison target, and the remaining neighbor reference patterns within the radius are excluded from the matching comparison target; and a pattern matching unit for matching the patterns determined as the matching comparison target by the pattern classifier with the input pattern.

2. The pattern matching apparatus of claim 1, wherein the pattern classifier includes all the nearest neighbor reference patterns of the selected reference model in the matching comparison target if the distance between the input pattern and the selected reference pattern is equal to or less than a third threshold value which is less than the first threshold value.

3. The pattern matching apparatus of claim 1, wherein the radius of the circle depends on the distance between the input pattern and the selected reference pattern.

4. A pattern matching method for matching an input pattern with reference patterns by extracting feature points of the input pattern to obtain a feature vector, and comparing the feature vector of the input pattern with the previously stored feature vectors of the reference patterns, the pattern matching method comprising the steps of:

(a) extracting the feature vector of the input pattern;

(b) calculating distance and direction between the feature vector of one of the reference patterns and the feature vector of the input pattern;

(c) including the reference pattern in a matching comparison target if the distance calculated in the step (b) is equal to or less than a first threshold value, and determining whether to include the reference pattern in the matching comparison target according to the distance and the direction if the distance is greater than the first threshold value; and (d) matching the patterns determined as the matching comparison target in the step (c) with the input pattern;

wherein the step (c) comprises the sub-steps of:

(c1) determining a predetermined radius of a circle having the point of the selected reference pattern as a center point according to the calculated distance; and (c2) excluding the neighbor reference patterns existing within the determined radius from the matching comparison target if the difference between the first threshold value and the calculated distance is equal to or greater than a third threshold value, and including the neighbor reference patterns, existing within the determined radius, whose direction with respect to the selected reference pattern is opposite to the direction of the reference pattern with respect to the input pattern in the matching comparison target and excluding the remaining neighbor reference patterns within the radius from the matching comparison target.

5. The pattern matching method of claim 4, further comprising the step of repeating the steps (b) and (c) on each reference pattern selected among a plurality of reference patterns.

6. The pattern matching method of claim 4, wherein in the step (c), the nearest neighbor reference patterns of the reference pattern are included in the matching comparison target if the distance calculated in the step (b) is equal to or less than a second threshold value which is less than the first threshold value.

* * * * *